(12) United States Patent
Cole

(10) Patent No.: US 12,078,053 B2
(45) Date of Patent: Sep. 3, 2024

(54) NULL POINT DEPTH CALIBRATION

(71) Applicant: The Charles Machine Works, Inc., Perry, OK (US)

(72) Inventor: Scott B. Cole, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 91 days.

(21) Appl. No.: 17/881,804

(22) Filed: Aug. 5, 2022

(65) Prior Publication Data

US 2023/0056853 A1     Feb. 23, 2023

Related U.S. Application Data

(60) Provisional application No. 63/231,055, filed on Aug. 9, 2021.

(51) Int. Cl.
| | | |
|---|---|---|
| *E21B 47/092* | (2012.01) | |
| *E21B 7/04* | (2006.01) | |
| *G01V 3/08* | (2006.01) | |
| *G01V 3/38* | (2006.01) | |

(52) U.S. Cl.
CPC ............ *E21B 47/092* (2020.05); *E21B 7/046* (2013.01); *G01V 3/081* (2013.01); *G01V 3/38* (2013.01)

(58) Field of Classification Search
CPC ....... E21B 47/092; E21B 7/046; G01V 3/081; G01V 3/38; G01V 3/15; G01V 3/08
See application file for complete search history.

(56) References Cited

U.S. PATENT DOCUMENTS

| | | |
|---|---|---|
| 4,390,836 A | 6/1983 | Bruce et al. |
| 4,542,344 A | 9/1985 | Darilek et al. |
| 4,742,356 A | 5/1988 | Kuipers |
| 4,812,812 A | 3/1989 | Flowerdew et al. |
| 5,264,795 A | 11/1993 | Rider |
| 5,397,986 A | 3/1995 | Conway et al. |
| 5,529,437 A | 6/1996 | Filipowski et al. |

(Continued)

FOREIGN PATENT DOCUMENTS

| | | |
|---|---|---|
| DE | 19533105 A1 | 10/1996 |
| EP | 0045486 A3 | 10/1982 |

(Continued)

OTHER PUBLICATIONS

Subsite Electronics, "TK Recon Series Guidance System", Operator's Manual, Jun. 2016, 63 pages, Perry, Oklahoma.

*Primary Examiner* — Tara Schimpf
*Assistant Examiner* — Jennifer A Railey
(74) *Attorney, Agent, or Firm* — Tomlinson McKinstry, P.C.

(57) ABSTRACT

A calibration method for calibrating an underground beacon and tracker system for use with horizontal directional drilling. The beacon emits a magnetic field, which is received at an above-ground receiving antenna. The antenna is used to locate front and rear null points in the emitted field. The vertical and horizontal offset between the null points is determined to locate the beacon. Then, the magnetic field strength is determined at one of the null points. This value may be used to calculate or update a calibration constant. The calibration constant is then used in subsequent locating step while the characteristics of the underground environment surrounding the beacon remain similar.

22 Claims, 3 Drawing Sheets

(56) References Cited

U.S. PATENT DOCUMENTS

| | | |
|---|---|---|
| 5,576,973 A | 11/1996 | Haddy |
| 5,640,092 A | 6/1997 | Motazed et al. |
| 5,699,048 A | 12/1997 | Galloway |
| 6,005,532 A | 12/1999 | Ng |
| 6,035,951 A | 3/2000 | Mercer et al. |
| 6,250,402 B1 | 6/2001 | Brune et al. |
| 6,268,731 B1 | 7/2001 | Hopwood et al. |
| 6,364,035 B2 | 4/2002 | Brune et al. |
| 6,536,538 B2 | 3/2003 | Brune et al. |
| 6,563,474 B2 | 5/2003 | Nantz et al. |
| 6,668,944 B2 | 12/2003 | Brune et al. |
| 6,737,867 B2 | 5/2004 | Brune et al. |
| 6,749,029 B2 | 6/2004 | Alft et al. |
| 6,865,455 B1 | 3/2005 | Wiegert |
| 6,868,314 B1 | 3/2005 | Frink |
| 6,882,154 B2 | 4/2005 | Mercer et al. |
| 6,924,767 B2 | 8/2005 | Kitahara et al. |
| 7,000,710 B1 | 2/2006 | Umbach |
| 7,009,399 B2 | 3/2006 | Olsson et al. |
| 7,013,990 B1 | 3/2006 | Nickel et al. |
| 7,021,403 B2 | 4/2006 | Brune et al. |
| 7,042,411 B2 | 5/2006 | Yagi et al. |
| 7,111,693 B1 | 9/2006 | Self et al. |
| 7,154,273 B2 * | 12/2006 | Mercer ............... G01V 3/08 324/326 |
| 7,231,320 B2 | 6/2007 | Papadimitriou et al. |
| 7,347,280 B2 | 3/2008 | Brune et al. |
| 7,350,594 B2 | 4/2008 | Cole et al. |
| 7,356,421 B2 | 4/2008 | Gudmundsson et al. |
| 7,562,722 B2 | 7/2009 | Brune et al. |
| 7,647,987 B2 | 1/2010 | Cole |
| 7,656,159 B2 | 2/2010 | Edelstein |
| 7,786,731 B2 | 8/2010 | Cole et al. |
| 7,952,357 B2 | 5/2011 | Cole |
| 8,018,382 B2 | 9/2011 | Shore et al. |
| 8,025,109 B2 | 9/2011 | Brune et al. |
| 8,072,220 B2 | 12/2011 | Dolgin et al. |
| 8,188,745 B2 | 5/2012 | Overby et al. |
| 8,393,414 B2 | 3/2013 | Brune et al. |
| 8,482,286 B2 | 7/2013 | Cole |
| 8,497,684 B2 | 7/2013 | Cole et al. |
| 8,928,323 B2 | 1/2015 | Cole et al. |
| 9,329,297 B2 * | 5/2016 | Cole ............... E21B 47/0232 |
| 9,547,101 B2 | 1/2017 | Cole et al. |
| 10,459,105 B2 | 10/2019 | Cole et al. |
| 10,822,941 B2 | 11/2020 | Perteet et al. |
| 11,149,539 B2 | 10/2021 | Zeller et al. |
| 11,204,437 B2 | 12/2021 | Cole et al. |
| 11,397,266 B2 | 7/2022 | Cole et al. |
| 2002/0020559 A1 | 2/2002 | Barbera et al. |
| 2002/0116129 A1 | 8/2002 | Alft et al. |
| 2004/0070399 A1 | 4/2004 | Olsson et al. |
| 2004/0190374 A1 | 9/2004 | Alft et al. |
| 2006/0036376 A1 | 2/2006 | Gudmundsson et al. |
| 2006/0055584 A1 | 3/2006 | Waite et al. |
| 2007/0044536 A1 | 3/2007 | Gunsaulis et al. |
| 2009/0153141 A1 | 6/2009 | Mercer |
| 2010/0001731 A1 | 1/2010 | Royle et al. |
| 2010/0002938 A1 | 1/2010 | Mulcahey |
| 2011/0227575 A1 | 9/2011 | Cole |
| 2012/0146648 A1 | 6/2012 | Eick et al. |
| 2013/0153299 A1 | 6/2013 | Brune et al. |
| 2013/0175092 A1 | 7/2013 | Kolpak et al. |
| 2014/0111211 A1 | 4/2014 | Cole et al. |
| 2014/0163775 A1 | 6/2014 | Metzler |
| 2014/0222248 A1 | 8/2014 | Levien et al. |
| 2014/0303814 A1 | 10/2014 | Burema et al. |
| 2015/0090496 A1 | 4/2015 | Rempe et al. |
| 2015/0149000 A1 | 5/2015 | Rischmuller et al. |
| 2016/0018551 A1 | 1/2016 | Cole et al. |
| 2016/0356146 A1 | 12/2016 | Gard et al. |
| 2017/0226805 A1 | 8/2017 | Cole |
| 2017/0299755 A1 | 10/2017 | Cole et al. |
| 2018/0299575 A1 | 10/2018 | Cole |
| 2019/0004203 A1 | 1/2019 | Olsson et al. |
| 2021/0131615 A1 | 5/2021 | Bailey et al. |

FOREIGN PATENT DOCUMENTS

| | | |
|---|---|---|
| EP | 1526606 A1 | 4/2005 |
| GB | 2006438 A | 5/1979 |
| JP | 2021288 A | 7/1988 |
| JP | 2003249816 A1 | 9/2003 |
| WO | 9530913 A1 | 11/1995 |
| WO | 0010456 A1 | 3/2000 |
| WO | 2006124520 A3 | 11/2006 |

* cited by examiner

NULL POINT DEPTH CALIBRATION

SUMMARY

The present invention is directed to a method. The method comprises advancing a drill string carrying a beacon to a first underground location, emitting an electromagnetic signal from the beacon and performing a calibration procedure. The calibration procedure comprises detecting a first null point and a second null point with a receiving antenna at an above ground location, determining a distance between the first null point and the second null point and storing the distance in a memory, receiving a signal indicative of a pitch of the beacon, determining a signal strength at the selected one of the first null point and the second null point, using the pitch and the signal strength to determine a calibration constant, and storing the calibration constant in a memory.

In another aspect, the invention is directed to a method. The method comprises emitting an electromagnetic field from a beacon at a below ground location, detecting the electromagnetic field at a tracking antenna at an above ground area, and determining a first null field location on a surface of the ground. The method further comprises determining a second null field location on the surface of the ground, detecting a strength of the electromagnetic field at a selected one of the first null field location and the second null field location, and from the first null field location, the second null field location, and the strength of the electromagnetic field, determining a calibration constant with the beacon at the below ground location.

BRIEF DESCRIPTION OF THE DRAWINGS

In FIG. 3, the "x" direction is a vertical direction, while the "z" direction is a horizontal, or longitudinal, direction along the bore path. A distance "r" is the true distance between the beacon and a particular point. $\Delta x$ and $\Delta z$ refer to the difference in the "x" and "z" directions between the null points.

DETAILED DESCRIPTION

Figure 1:
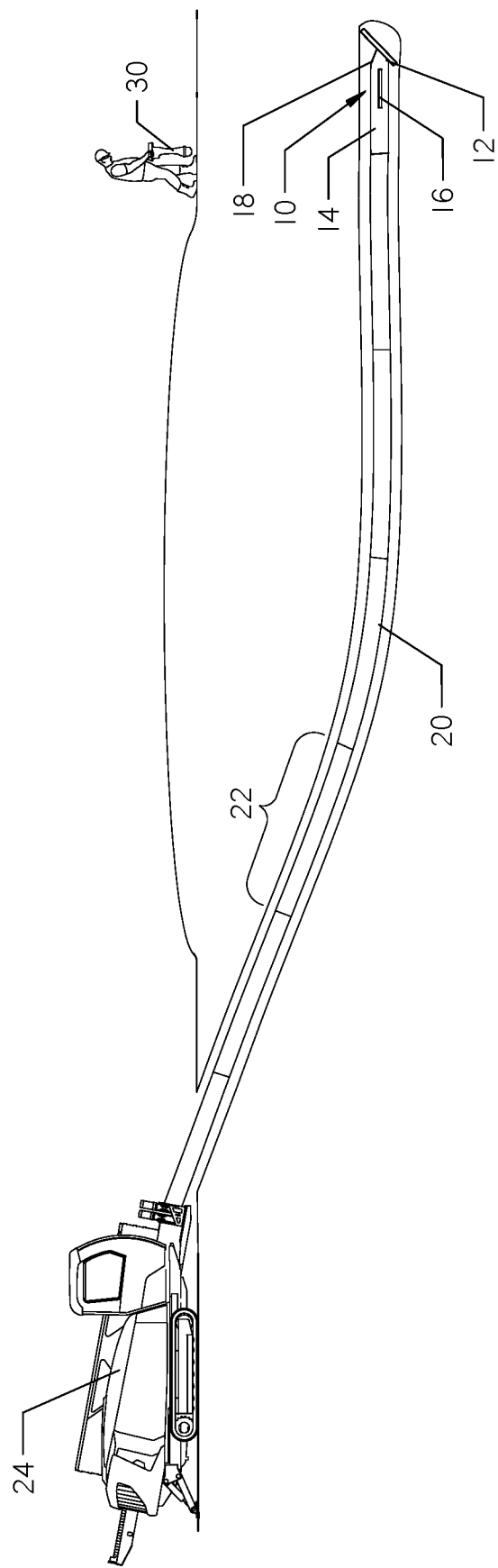
FIG. 1 is a diagrammatic representation of a horizontal directional drilling machine which is driving a drill string in an underground environment. The drill string supports a downhole tool assembly at its distal end. The assembly comprises a bit and housing. A beacon is housed within the housing and emits a dipole magnetic field into the underground environment which is detectable at an above ground location. A tracker is used to determine the location of the beacon.

In horizontal directional drilling applications, a steerable boring tool 10 is used as a part of a downhole tool assembly. The boring tool 10 may comprise a bit 12, such as a slant-faced bit, which enables the steering of the boring tool 10. The boring tool 10 will include a housing 14 that contains a beacon 16. The tool 10 is at an underground location at a distal end 18 of a drill string 20. The drill string 20 is made up of multiple pipe segments 22, and advanced and rotated by a horizontal directional drilling machine 24.

To steer the boring tool 10, it is important to know the location and orientation (roll, pitch and yaw) of the beacon 16. Various beacons 16 have been developed to provide an operator with information concerning the location and orientation of the downhole tool assembly 12. This information is transmitted via electromagnetic signal to an above ground tracker 30. In particular, roll, pitch, and yaw may be detected by on-board sensors located at the boring tool 10. Alternatively, some orientation of the boring tool 10 may be determined based upon the drill string 20 clock orientation as measured at the horizontal directional drill 24.

Location of a boring tool is determined by using the tracker 30. The beacon 16 emits an electromagnetic dipole field which the tracker 30 detects in three dimensions using an onboard tracking antenna. Such a tracking antenna may be that disclosed and discussed in U.S. Pat. No. 7,647,987, issued to Cole, or U.S. Pat. No. 11,204,437, issued to Cole, et. al., the contents of which are incorporated herein by reference.

Figure 2:
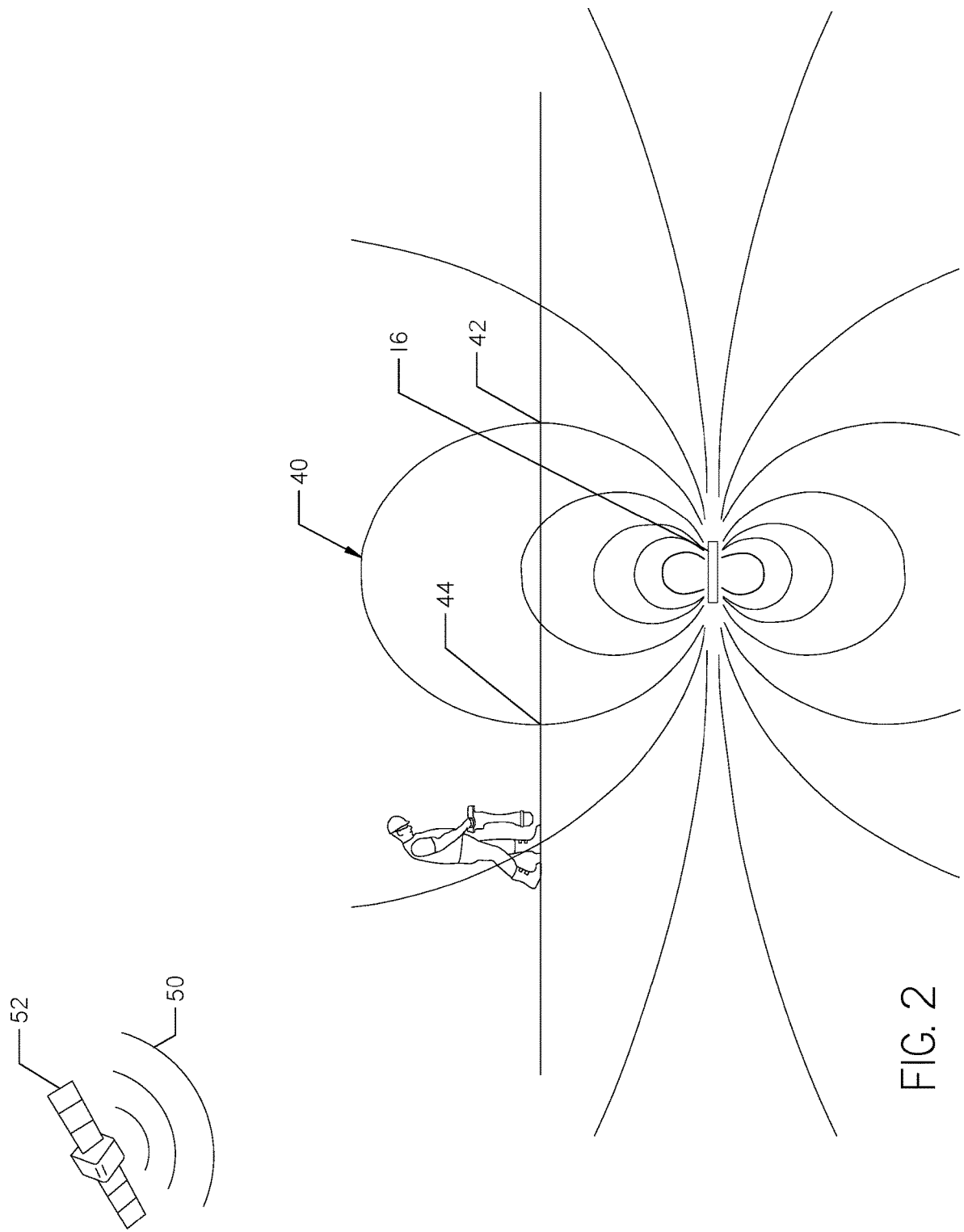
FIG. 2 shows an underground beacon emitting a magnetic field. The magnetic field has front and rear null points. A tracker operator is shown on the ground surface using a tracker to find the front and rear null points. A GPS satellite is shown emitting a signal that can be used by the tracker to determine its absolute location.

In general, as shown in FIG. 2, a tracking operation is conducted by placing the tracker 30 within electromagnetic dipole field 40 emitted by the beacon 16. The dipole field 40 will have "null points" along the path of the drill string 20 (FIG. 1) in two locations. It should be understood that a "null point", in the industry, refers to a point at which the horizontal components of the electromagnetic field are negligible across a vertical plane. In FIG. 2, these points are represented by the location where the field's tangent is vertical. One such point is in front of the beacon along a projected bore path, referred to as a front null 42. Another such point is behind the beacon, above the drill string, referred to as a rear null 44. Detection of the field strength at the null points 42, 44 aids in the determination of the location of the beacon 16, and therefore, the boring tool 10 (FIG. 1).

The absolute location of the tracker 30 may be determined by a GPS signal 50 emitted by one or more satellites 52. A method for determining the absolute location of the beacon 16 utilizing the GPS signal is provided in U.S. Pat. No. 11,397,266, issued to Cole, et. al., the contents of which are incorporated herein by reference.

To provide accurate location and orientation information it is important that the tracker 30 and beacon 16 assembly are properly calibrated with one another. Calibration typically includes adjusting the intensity or signal strength of the output signal of the beacon 16 to be sufficiently detected by the tracker 30. A typical procedure for calibrating a beacon is disclosed in U.S. Pat. No. 7,331,409, the entire contents of which are incorporated herein by reference.

Calibration is typically performed after placing a beacon 16 within a housing 14, but prior to beginning a drilling operation. In one method of configuring the signal strength of the beacon's output signal, the tracker 30 and housing are directly aligned and positioned a known distance, preferably ten feet, from each other. The tracker 30 then uses the strength of the beacon's output signal and the known distance between the tracker 30 and the beacon 16 to calculate a constant "k" in the below equation;

$$B = k/d^3$$

Where,

B=the strength of the magnetic field detected by the tracker 30;

d=the distance between the tracker 30 and beacon 16; and k=a constant that is stored by the tracker 30 for subsequent measurements to determine the distance between the tracker and housing 14.

The constant "k" is used by the tracker 30 during drilling operations to determine the precise depth of the beacon 16. The above equation can be used to solve for "k" if the tracker 30 is directly over or directly in-line with the beacon 16. When calibration is performed prior to starting drilling operations, the operator can be sure that the tracker 30 is directly in-line with the beacon 16.

In the underground environment, however, multiple factors may lead to an inaccurate depth reading between the tracker 30 and beacon 16 during a drilling operation. This may especially be true as beacon 16 depth becomes greater and soil conditions change. For example, a soil with an increased concentration of ferrous material or boring under salt water may cause the "k" value determined from the calibration to be less accurate. If the operator suspects that conditions exist that are producing inaccurate depth readings, a method is needed to recalibrate the tracker 30 to the beacon 16 during boring operations to account forte underground environment.

The present invention provides a method of recalibrating the tracker 30 to the beacon 16 after a drilling operation has begun and the beacon is underground. In contrast to traditional calibrating methods, the operator may not know if the tracker 30 is directly over or directly in-line with the beacon 16, and the precise distance between the tracker 30 and the beacon 16 or precise depth of the beacon is unknown. Because of these unknown factors, the traditional method of calibration by using the equation by B=k/d$^3$ is less applicable.

The present invention provides a method for re-calibrating the tracker 30 to the beacon 16 by measuring the position and distance between known points within the electromagnetic field 40 using the null points 42, 44.

Figure 3:
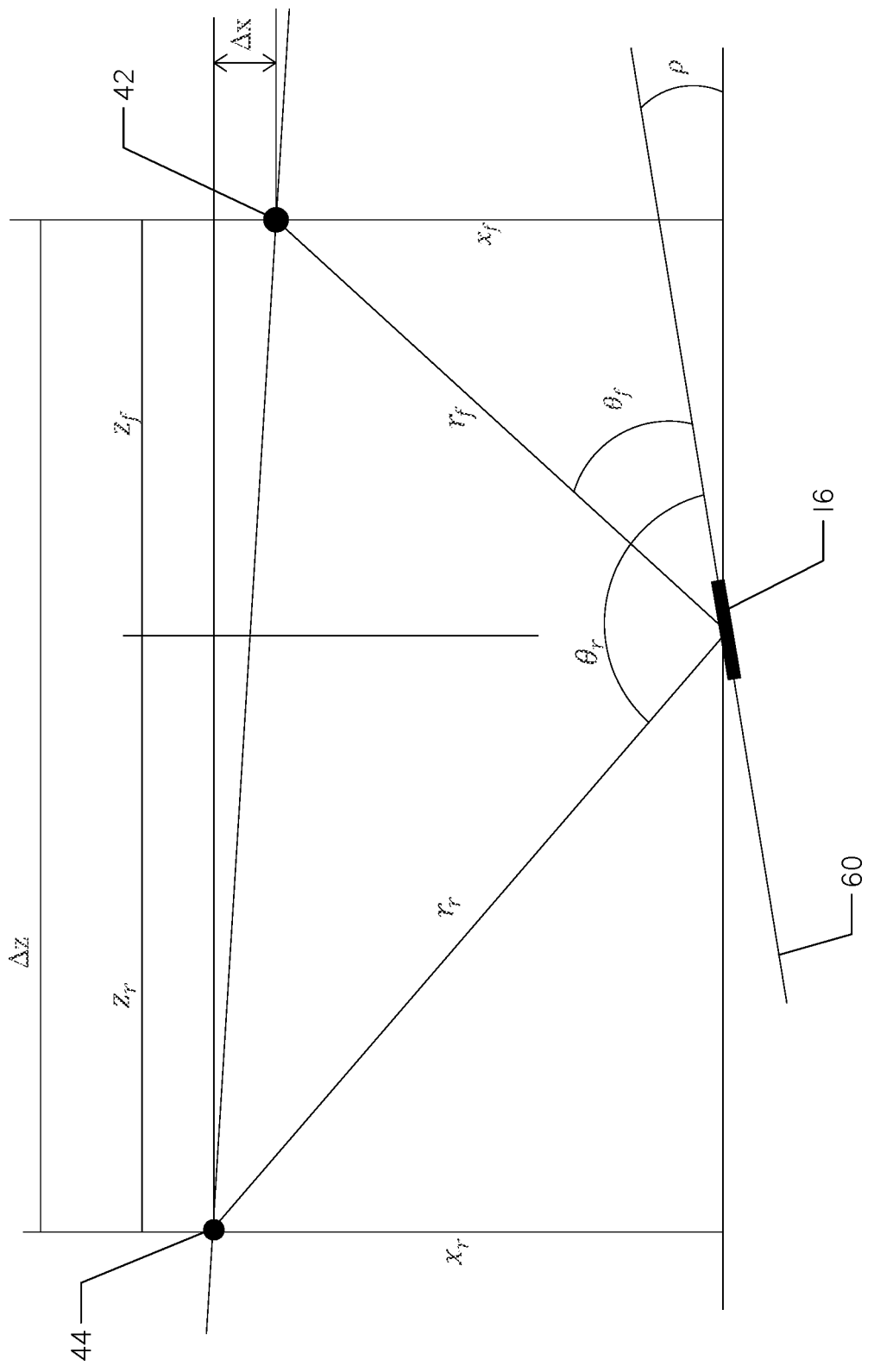
FIG. 3 is a diagram providing a legend for the various geometric variables involved in performing the calibration method. The beacon is shown at its underground location, with front and rear null points shown as well.

With reference now to FIG. 3, when the ground is flat, the front null 42, rear null 44, and beacon 16 form an isosceles triangle. Thus, the precise depth of the beacon 16 may be found by the equation d=$\Delta$z/sqrt(2), where "d" is the depth of the beacon and "$\Delta$z" is the distance between the front and rear null points. The preceding equation is only applicable when the pitch $\rho$ of the downhole tool assembly is zero and the elevation at each null point is equal.

In reality, the "depth" will likely be different at each null point by a difference $\Delta$x. If the pitch $\rho$ does not equal to zero, the depth is found by the equation:

$$x_f = \frac{\Delta z + \Delta x \cdot \cot(\theta_r + \rho)}{\cot(\theta_f + \rho) - \cot(\theta_r + \rho)}$$

Where,
$x_f$=the precise depth between the beacon 16 and the front null point 42;
$\Delta$z=the horizontal distance between the front 42 and rear 44 null points;
$\Delta$x=the depth offset between the null points 42, 44 if the terrain is not level;
$\theta_f$=the included angle between the front null point 42 and a longitudinal axis 60 of the beacon 16;
$\theta_r$=the included angle between the rear null point 44 and a longitudinal axis 60 of the beacon 16; and
p=the pitch of the beacon 16 as detected by sensors at the beacon 16.

If the terrain is not constant, it can be accounted for as a depth offset $\Delta$x and can be measured by GPS, a laser level, altimeter, etc. If the terrain is level, $\Delta$x in the above equation will equal zero.

$\theta_f$ and $\theta_r$ in the above equation can be found using the below equations, the mathematical proofs of which can be found in Exhibit "A" to U.S. Provisional Patent Application No. 63/231,055, to which this application claims priority, the contents of which are incorporated by reference herein.

$$\theta_f = \frac{1}{2}\left(-\rho + \cos^{-1}\left(-\frac{\cos(\rho)}{3}\right)\right)$$

$$\theta_r = \pi - \frac{\rho}{2} - \frac{1}{2} \cdot \cos^{-1}\left(-\frac{\cos(\rho)}{3}\right)$$

Utilizing the preceding equations, the tracker 30 operator may determine the precise depth of the beacon 16 by locating and measuring the distance between the null points 42, 44.

The method may include locating and digitally marking with GPS coordinates at a first one of the front 42 and rear 44 null point using the GPS signal 50. The operator may then locate and digitally mark with GPS coordinates at a second of the front 42 and rear 44 null point. The tracker 30 onboard processor may then automatically calculate the distance between the front 42 and rear 44 null points, and thereby determine the precise depth of the beacon 16. Alternatively, the tracker 30 operator may manually measure and enter the distance between the null points 42, 44.

Once the precise depth between the front null point 42 and the beacon 16 or "$x_f$" of the beacon is determined, the fact that the tracker 30 is not directly over the beacon needs to be accounted for. To do this, "$x_f$" can be used to solve for the radial distance "$r_f$" between the tracker 30 at the first null point 42 and the beacon 16 using the Pythagorean equation:

$$r_f^2 = x_f^2 + z_f^2$$

Where,
$x_f$=the vertical distance between the front null point 42 and the beacon 16;
$z_f$=the horizontal distance between the front null point 42 and beacon 16; and
$r_f$=the radial distance between the front null point 42 and the beacon 16.

In the above equation, $z_f$ can be found using the equation:

$$z_f = \frac{x_f}{\tan(\theta_f + \rho)}$$

Where,
$z_f$=the horizontal distance between the front null point 42 and beacon 16;
$x_f$=the vertical distance between the front null point 42 and the beacon 16;
$\theta_f$=the included angle between the front null point 42 and a longitudinal axis 60 of the beacon 16; and
p=the pitch of the beacon 16.

Once "$r_f$" is found, the tracker 30 may be re-calibrated by solving for "k" in the below equation:

$$B_T = \frac{k}{r_f^3} \cdot \frac{1}{\sqrt{2}} \cdot \sqrt{3 \cdot \cos(2\theta_f) + 5}$$

The above equation can be re-written as:

$$k = \frac{\sqrt{2} \cdot B_T \cdot r_f^3}{\sqrt{3 \cdot \cos(2\theta_f) + 5}}$$

In the above equation:
B=the strength of the magnetic field 40 detected by the tracker 30 at the front null point 42;
k=a constant that is stored by the tracker 30 for subsequent measurements to determine distance between the tracker 30 and beacon 16;
$r_f$=the radial distance between the front null point 42 and the beacon 16; and
$\theta_f$=the included angle between the front null point 42 and a longitudinal axis 60 of the beacon 16.

Once a new "k" value is determined, the new "k" value may be stored in a memory by the tracker 30 and subsequently used for measuring the precise location of the beacon 16 as the boring tool 10 is advanced by the drill string 20. It will be appreciated that once the tracker 30 is properly calibrated, it is no longer necessary to locate both the front 42 and rear 44 null points to precisely determine the depth of the beacon using methods known in the art.

As underground conditions change, the calibration process may be repeated. It may also be preferable to configure the tracker 30 to store more than one "k" value. For instance, once a problematic soil condition has been traversed, it may be preferable to simply recalibrate the tracker 30 using a prior stored "k" value.

In additional embodiments, the precise depth of the beacon 16 may be determined by using a distance "$r_r$" between the beacon 16 and the rear null point 44, instead of the front null point 42. Likewise, the above equations may be calculated using the rear null point 44, instead of the front null point 42, where applicable and preferred. For example, it may be that one of the front 42 and rear 44 null points is inaccessible or difficult for tracker placement.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. A method, comprising:
advancing a drill string carrying a beacon to a first underground location;
emitting an electromagnetic signal from the beacon;
performing a calibration procedure comprising:
at an above ground location, detecting a first null point and a second null point with a receiving antenna;
determining a distance between the first null point and the second null point and storing the distance in a memory;
receiving a signal indicative of a pitch of the beacon;
determining a signal strength at the selected one of the first null point and the second null point;
using the pitch and the signal strength to determine a calibration constant; and
storing the calibration constant in a memory.

2. The method of claim 1 further comprising:
using the distance between the null points to determine a depth of the beacon below a selected one of the first null point and the second null point and storing the depth in the memory;
from the distance and the depth, determining a radial distance between the beacon and the selected one of the first null point and the second null point; and
using the radial distance to determine the calibration constant.

3. The method of claim 2 further comprising:
thereafter, advancing the drill string; and
using the calibration constant determined with the beacon at the first underground location, determining a location of the beacon after the drill string has been advanced.

4. The method of claim 2 further comprising:
advancing the drill string such that the beacon is at a second underground location, in which the second underground location has differing soil conditions from the first underground location; and
performing the calibration procedure at the second underground location.

5. The method of claim 4 further comprising:
thereafter, advancing the drill string; and
using the calibration constant determined with the beacon at the second underground location, determining a location of the beacon after the drill string has been advanced.

6. The method of claim 4 further comprising:
thereafter, advancing the drill string; and
using the calibration constant determined with the beacon at the first underground location, determining a location of the beacon after the drill string has been advanced.

7. The method of claim 4 in which the calibration constant determined by the calibration procedure with the beacon at the first underground location is characterized as a first calibration constant and the calibration constant determined by the calibration procedure with the beacon at the second underground location is characterized as a second calibration constant; and
in which:
each of the first calibration constant and second calibration constant are stored in the memory; and
one of the first calibration constant and second calibration constant is selected for use when the beacon is at a third underground location.

8. The method of claim 2 in which the distance is determined by a method comprising the steps of:
locating the first null point;
marking a location of the first null point;
locating the second null point;
marking a location of the second null point; and
measuring the distance between the marked locations of the first and second null points.

9. The method of claim 8 in which the location of the first null point and the second null point are physically marked; and
manually measuring the distance between the physical marks.

10. The method of claim 8 in which the steps of marking a location of a first null point and marking a location of a second null point comprise digitally marking GPS coordinates.

11. The method of claim 10 in which a processor calculates the difference between the first null point and the second null point from the GPS coordinates.

12. The method of claim 1 in which the selected one of the first null point and the second null point is located above the drill string.

13. The method of claim 1 in which the selected one of the first null point and the second null point is located in front of a projected path of the drill string.

14. The method of claim 1 further comprising determining a vertical distance between the first null point and the second null point.

15. The method of claim 14 wherein the step of determining the vertical distance comprises using an altimeter.

16. The method of claim 14 wherein the step of determining the vertical distance comprises using a laser level.

17. A method comprising:
    emitting an electromagnetic field from a beacon at a below ground location;
    detecting the electromagnetic field at a tracking antenna at an above ground area;
    determining a first null field location on a surface of the ground;
    determining a second null field location on the surface of the ground;
    at a selected one of the first null field location and the second null field location, detecting a pitch of the beacon and a strength of the electromagnetic field; and
    from the first null field location, the second null field location, the pitch, and the strength of the electromagnetic field, determining a calibration constant with the beacon at the below ground location.

18. The method of claim 17 in which the first null field location and the second null field location are determined by the tracking antenna.

19. The method of claim 17 further comprising
    determining a distance between the first null field location and the second null field location; and
    determining a depth of the beacon relative to a selected one of the first null field location and the second null field location.

20. The method of claim 17 further comprising:
    with a drill string connected to a horizontal directional drilling system, advancing the beacon to the below ground location;
    after the step of determining the calibration constant at the below ground location, advancing the beacon to a new below ground location;
    thereafter, determining a depth of the beacon at the new below ground location using the calibration constant.

21. The method of claim 17, wherein the below ground location is characterized as a first below ground location and further comprising:
    advancing the beacon to a second below ground location; and
    changing the calibration constant based upon the first null location, the second null location, and the strength of the electromagnetic field with the beacon at the second below ground location.

22. The method of claim 17, wherein the step of detecting the pitch of the beacon at a selected one of the first null field location and the second null field location comprises:
    with a below-ground sensor, detecting a pitch of the beacon;
    transmitting the pitch of the beacon as an electromagnetic signal; and
    detecting the electromagnetic signal at a selected one of the first null field location and the second null field location.

* * * * *

UNITED STATES PATENT AND TRADEMARK OFFICE
CERTIFICATE OF CORRECTION

| | | |
|---|---|---|
| PATENT NO. | : 12,078,053 B2 | Page 1 of 1 |
| APPLICATION NO. | : 17/881804 | |
| DATED | : September 3, 2024 | |
| INVENTOR(S) | : Cole | |

It is certified that error appears in the above-identified patent and that said Letters Patent is hereby corrected as shown below:

In the Specification

Column 3, Line 22, please delete "forte" and substitute therefore "for the".

Column 3, Line 42, please delete "d=Δ2" and substitute therefore "d=Δz".

Column 4, Line 65, please delete "$r^3{}_f$" and substitute therefore "$r_f^3$".

Column 5, Line 4, please delete "$r^3{}_f$" and substitute therefore "$r_f^3$".

Signed and Sealed this
First Day of October, 2024

*Katherine Kelly Vidal*

Katherine Kelly Vidal
*Director of the United States Patent and Trademark Office*